Patented Feb. 26, 1924.

1,484,979

UNITED STATES PATENT OFFICE.

CHARLES A. WHITING, OF FRANKLIN, MASSACHUSETTS, ASSIGNOR TO WHITING & DAVIS COMPANY, A CORPORATION OF MASSACHUSETTS.

METHOD OF MAKING INTERMESHING LINKS.

No Drawing.      Application filed August 1, 1922. Serial No. 579,080.

*To all whom it may concern:*

Be it known that I, CHARLES A. WHITING, a citizen of the United States, residing at Franklin, in the county of Norfolk, State of Massachusetts, have invented certain new and useful Improvements in Methods of Making Intermeshing Links; and I do hereby declare the following to be a full, clear, and exact description of the invention, such as will enable others skilled in the art to which it appertains to make and use the same.

This invention is directed to the provision of improvements in the manufacture of intermeshing links such for instance as chain mesh and the like, the invention being of special value in the manufacture of metallic mesh of the character commonly used in the manufacture of mesh bags.

Mesh of the character referred to is commonly made on automatic machines which cut short sections from a continuous piece of wire, bend each section to the form of a staple, pass the legs of the staple through rings of the mesh already formed and then form the staple into a ring. In so forming the staple into a ring, the ends of the piece of wire are brought into abutment and the wire is given a set whereby it is made to hold its position with its ends in abutment. In order that the mesh may have the desirable strength and also in order that it may be of attractive appearance, it is usual to connect the ends of each link together by solder which completely fills the space between the ends so as to seal the joint and which unites the ends and thereby affords a degree of strength at the joint comparable to the strength of the wire itself.

In accordance with the practice which has been commonly followed heretofore, the wire employed in the manufacture of link mesh is wire of the type known as solder-core wire, that is, wire provided with a central core of solder. When mesh is made from wire of this character it is subjected to a relatively high temperature in a suitable furnace and the wire at the ends of the links softens enough to flow out into the joint and fill the same. Then, when the mesh is taken out of the furnace the solder hardens and the rings have the appearance and strength of endless rings. While very satisfactory mesh may be made in this way, the solder-core wire is relatively costly and furthermore unless solder-core wire of a high grade of uniformity is employed, some of the joints in the completed mesh are imperfect.

The present invention is directed to the provision of an improved method of manufacturing such mesh, the distinguishing characteristic of which is that it is unnecessary to use solder-core wire. In accordance with this improved method, a suitable solder compound is applied to the exterior of the wire employed in the manufacture of the mesh; it may be applied in any suitable manner but preferably by electro-plating. Also, it may be applied either before or after the sections of wire are cut from the continuous length and bent to the form of the completed links.

This improved method is especially well adapted for use in the manufacture of mesh from wire which is to be plated with a precious metal. In such instances, the soldering compound contains the precious metal which is to be plated upon the wire so that a single operation of electro-plating supplies the surface covering desired for appearance and also the solder required for closing the joints in the rings. For instance, instead of the silver solution ordinarily employed for silver-plating upon mesh, a silver solder may be employed composed of silver, copper and high brass and this may be applied to the wire by electro-deposition just as the pure silver has commonly been applied heretofore. When the piece of mesh has been so plated, it is placed in a suitable furnace and heated to the required degree, whereupon the soldering compound at the ends of the pieces of wire from which the links are formed softens and flows to an extent sufficient to completely fill such spaces as exist there. Then when the mesh is removed from the furnace the solder solution hardens and the mesh is soldered mesh of the same strength and attractive appearance as the mesh heretofore made from solder-core wire.

It has been found in practice that good results are obtained when the solder solution is applied by electro-deposition after the manufacture of the mesh has been completed, but it is to be understood that the deposition of the solder compound may take place at some other stage of the process of manufacture; for instance, it may be applied to the wire itself before cutting it from the continuous length and making it into rings.

Also, it is to be understood that the utility of the invention is not limited to the manufacture of link mesh of the type employed in making hand bags for it may be employed in the manufacture of intermeshing links of other types and for other purposes; in particular, the improved method may be employed in the manufacture of chain wherein each link is meshed with one other link in adding it to the chain whereas in mesh each link is meshed with two other links in adding it to the mesh.

Also, it is to be understood that the invention is of wide application with respect to the materials employed. The material applied to the exterior of the wire must be or must contain solder but except for this requirement the wire itself and the composition applied to the exterior of the wire may be any desired metal or composition of metal.

I claim:

1. The process of making intermeshing links which consists in coating the material of the links with a metallic soldering compound and then subjecting the material to heat to cause the soldering compound to fill the joints in the links.

2. The process of making intermeshing links which consists in electrically depositing upon the material of the links a soldering compound containing a precious metal and then subjecting the mesh to heat to cause the soldering compound to fill the joints in the links.

3. The process of making soldered link-mesh which consists in making the mesh from non-solder-core wire, electro-depositing a soldering compound upon the mesh, heating the mesh to cause the compound to flow and then cooling the mesh and thereby hardening the soldering compound which fills the joints in the links.

4. The process of making link mesh which consists in electro-depositing upon a piece of mesh a soldering compound containing a precious metal and then subjecting the piece of mesh to heat to cause the soldering compound to flow and fill the joints in the links.

5. As an article of manufacture, mesh having the links thereof made of metallic wire and having a readily fusible metallic compound plated upon the surface thereof, the joints of the several links being closed by the material of the said plating compound.

In testimony whereof I affix my signature.

CHARLES A. WHITING.